(No Model.)

C. TOUSSAINT.
VIAL OR BOTTLE.

No. 274,995. Patented Apr. 3, 1883.

WITNESSES:
Wm A. Lowe
A. G. Chichester

INVENTOR
Christian Toussaint
BY C. Chichester
ATTORNEY

UNITED STATES PATENT OFFICE.

CHRISTIAN TOUSSAINT, OF NEW YORK, N. Y., ASSIGNOR TO MAX GERSTEN-DORFER AND ALBERT GERSTENDORFER, BOTH OF HOBOKEN, N. J.

VIAL OR BOTTLE.

SPECIFICATION forming part of Letters Patent No. 274,995, dated April 3, 1883.

Application filed November 4, 1882. (No model.)

*To all whom it may concern:*

Be it known that I, CHRISTIAN TOUSSAINT, of the city of New York, in the county of New York and State of New York, have invented certain new and useful Improvements in Vials or Bottles, of which the following is a full, clear, and exact description, reference being had to the accompanying drawings, and to the letters of reference marked thereon.

My invention relates especially to vials used for containing paints, bronzes, cosmetics, or any other substance which requires to be mixed in any manner after being removed from the vial, and before use, and has for its object the production of a device which shall embody in itself a receptacle for the unmixed substance and a suitable depression, cavity, or cup wherein it may be mixed for use.

To accomplish this end my invention consists of a vial or bottle blown or cast in the usual manner, but having the mixing-cavity formed at a convenient point upon its exterior surface, in such a manner as to permit the user to hold the vial in his hand while mixing the material with a brush or other suitable implement, and while using the prepared substance. The mixing-cavity should be of sufficient depth to prevent danger of spilling the mixed substance.

Figure 1:
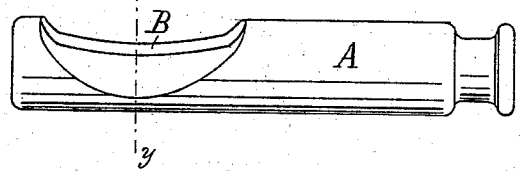
Figure 2:
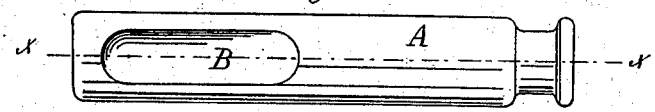
Figure 3:
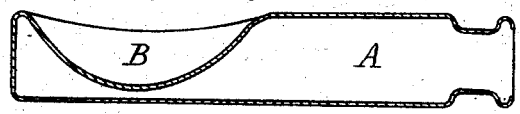
Figure 4:
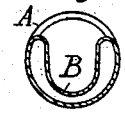

In the drawings, Figure 1 is a side view of a round vial constructed in accordance with my invention. Fig. 2 is a plan view thereof. Fig. 3 is a longitudinal vertical sectional view at line *x x* of Fig. 2, and Fig. 4 is a cross-sectional view at line *y y* of Fig. 1.

Like letters of reference, wherever they occur, indicate corresponding parts in all the figures.

A is the body of the vial, formed of glass, either blown or cast in the usual manner.

B is the mixing cavity or depression formed in the side wall of the vial. This cavity should extend nearly to the opposite wall of the vial, in order to be of sufficient depth to properly hold the prepared material and to place the center of gravity at such a point as to prevent the turning or rolling of the vial, and consequent spilling of the contents of the mixing-depression.

Having now fully described my invention, what I claim as new therein, and desire to secure by Letters Patent, is—

1. As a new article of manufacture, a vial or bottle having an open cavity formed in the side wall thereof, said cavity extending nearly to the wall of the bottle opposite to that in which it is formed, and being located and arranged in such a manner that the center of gravity of any contents of the cavity will be low enough to prevent the turning or rolling of the bottle, substantially as shown and described.

2. In a vial or bottle of the character herein specified, the open cavity B, formed in a side wall thereof, and extending nearly to the opposite wall, said cavity being deep proportionate to width, substantially as shown and described.

CHRISTIAN TOUSSAINT.

Witnesses:
 G. H. WETJER,
 ALONZO G. CHICHESTER.